UNITED STATES PATENT OFFICE.

FERDINAND FRITZ, OF LONDON, ENGLAND.

INCANDESCENT MANTLE AND PROCESS OF MAKING SAME.

SPECIFICATION forming part of Letters Patent No. 628,787, dated July 11, 1899.

Application filed January 23, 1899. Serial No. 703,163. (No specimens.)

*To all whom it may concern:*

Be it known that I, FERDINAND FRITZ, chemist, a subject of the German Emperor, residing at London, England, have invented a certain new and useful Improved Incandescent Mantle and Process of Making the Same, of which the following is a specification.

My invention relates to an improved incandescent mantle and a process of manufacturing the same.

The process hitherto generally practiced of manufacturing incandescent mantles may be considered as well known. It consisted in preparing solutions of certain earths or metallic salts, mixing such solutions, impregnating with the mixed solution woven fabrics or fibrous material, and subsequently eliminating such fabrics or fibers by combustion, thereby obtaining an extremely-brittle crystalline structure, which when exposed to a considerable heat developed an intense light. This process of manufacturing incandescent mantles was based on the supposition that the capacity of emitting light of sufficient strength was due to the mixture, while in solution, of the salts or earths employed for the purpose. Experience and a long series of experiments, however, have proved that the supposition above mentioned is erroneous. Each of the oxids produced glows by itself, and only the mixture or combination of the different rays of light emitted by the different earths or oxids is the cause of the excellent luminous effect visible. If, for instance, an incandescent mantle is previously prepared by impregnating fabrics or fibrous material with a solution of zirconium, or thorium, or magnesium, or calcium and by eliminating the fibrous matter by combustion, as usual, and if the mantle thus prepared is subsequently brought into a solution of cerium, it will be found that the mantle, which first yielded but a very poor light, has had imparted to it by such subsequent treatment a strong illuminative power. Having established these facts and the object of this invention being to provide an incandescent mantle not only of great illuminating power, but also of superior stability and durability, I realize these *desiderata* by proceeding as follows:

First, I prepare a solution of nitrate of cerium, (soluble in solutions of other salts,) and I boil said solution of nitrate of cerium, whereby part of the mixture of cerium is precipitated and separated. I can also, if desired, solve in cold or tepid water, instead of boiling, with the same effect. This precipitated powder, containing about one-fifth of the mixture of cerium contained in the solution, is withdrawn, and the remaining fluid, which may be termed "cerium extracts," containing about eighty per cent. of the mixture of cerium, is now employed to form a coating fluid for incandescent mantles. Such coating fluid is prepared in the following manner: From ten to twenty grams of the fluid (cerium extract) above described (the quantity varying according to the desired shade of white or yellow of the light to be produced) are added to one liter of a solution of celloidin in alcohol and ether of approximately the following constitution, viz: two parts, by weight, of alcohol, two parts, by weight, of ether, and one part, by weight, of celloidin.

By coating an incandescent mantle after combustion with the coating fluid prepared as above described there will be imparted to the said mantle not only an excellent illuminating power, but also great durability, and its faculty of emitting light does not depend on the particular kind and nature of the salt or oxid which had been used in the first place in preparing the incandescent mantle or skeleton, but on the subsequent coating, as described.

What I claim is—

1. The process of preparing incandescent mantles, consisting in first impregnating a mantle of textile fiber with any known solution of metallic salts or of rare earths, destroying the fiber by combustion and, subsequently treating the mantle or skeleton with a solution of celloidin in alcohol and ether, and with a solution of a salt of cerium, substantially as, and for the purpose, set forth.

2. The process of preparing incandescent mantles, consisting in first impregnating a mantle of textile fiber with any known solution of metallic salts or rare earths, destroying the fiber by combustion and, subsequently, dipping the mantle or skeleton so obtained into a fluid containing alcohol, ether, celloidin and "cerium extract," substantially as, and for the purpose, described.

In testimony whereof I have hereunto set my hand in presence of two subscribing witnesses.

FERDINAND FRITZ.

Witnesses:
ERNST LAVVERTI,
WM. O. BROWN.